INVENTORS
ELDRED L. DANCE
KERNAL G. SHAW
BY Walter J. Monacelli
ATTORNEY

April 10, 1973   E. L. DANCE ET AL   3,726,849
CONTINUOUS PROCESS FOR THE SOLUTION POLYMERIZATION
OF OLEFINIC MONOMERS
Original Filed Sept. 15, 1966   5 Sheets-Sheet 5

INVENTORS
ELDRED L. DANCE
BY  KERNAL G. SHAW

Walter J Monarelli
ATTORNEY

United States Patent Office

3,726,849
Patented Apr. 10, 1973

3,726,849
CONTINUOUS PROCESS FOR THE SOLUTION POLYMERIZATION OF OLEFINIC MONOMERS
Eldred L. Dance, 110 El Monte Way, and Kernal G. Shaw, 941 David Ave., both of Concord, Calif. 94520
Continuation of application Ser. No. 579,572, Sept. 15, 1966, which is a continuation-in-part of application Ser. No. 256,598, Feb. 6, 1963. This application Jan. 19, 1970, Ser. No. 4,443
Int. Cl. C08f 1/08, 3/10
U.S. Cl. 260—93.1
10 Claims

ABSTRACT OF THE DISCLOSURE

This invention comprises a process, and apparatus used therefor, for controlling the type of polymer product produced during solution polymerization of an olefin, such as propylene, by making certain adjustments in operating conditions and making an adjustment in the rate of introducing the monomer feed stream to compensate for the overall effect of these various other alterations of conditions on the temperature of the polymerization mixture, the rate of introduction of the monomer feed stream being decreased when this temperature falls below a preselected temperature and this rate of introduction being increased when this temperature rises above the preselected temperature. One or more adjustments which can be made, and for compensation of which the above overall adjustment is made, are: (a) decreasing or increasing the ratio of monomer to solvent in the monomer feed stream as the molecular weight of the product is determined to be above or below respectively the desired molecular weight; (b) lowering or raising the temperature of the monomer feed stream as the percent of polymer in the effluent stream is determined to be below or above respectively the desired percentage, and (c) increasing or decreasing the rate of introduction of the catalyst feed stream as the production rate of the polymer is determined to be below or above the desired production rate.

---

The application is a continuation of application Ser. No. 579,572, filed Sept. 15, 1966, now abandoned, which in turn is a continuation-in-part of application Ser. No. 256,598, filed Feb. 6, 1963, now abandoned.

This invention relates to a polymerization process involving a means for controlling the molecular weight of the polymer product. More specifically, this invention relates to a simple, reliable, self-regulating solution polymerization process which provides for easy selective adjustment of polymer molecular weight, effluent polymer content, and polymer production rate without the occurrence of polymer precipitation or undesired increases in the percent of amorphous polymer product or decreased yield of polymer per pound of catalyst used.

The process of this invention is further characterized as utilizing means for automatically altering the rate at which monomer-solvent solution is fed to an intensely stirred, preferably liquid-filled, adiabatic reactor in order to hold the reactor effluent temperature essentially constant at a pre-selected value.

It is important in order to produce a marketable polymer product to control the molecular weight of the polymer for resultant desirable properties in the product. For example, to facilitate extrusion and for typical molding specifications it is desirable to have a polypropylene molecular weight range of 200,000–250,000. Moreover the viscosity of the polymer is also affected quite drastically by molecular weight, with excessive viscosities fouling equipment and having high pumping requirements.

Moreover, for economic reasons a high yield of polymer per pound of catalyst consumed is required.

Furthermore, since the presence of substantial amounts of amorphous or atactic polymer adversely affects the properties of the product, it is desirable to keep the proportion of such undesired material to a minimum and to obtain primarily isotactic or stereoregular polymers.

The most important processes for producing stereoregular polymers of olefinic compounds are those using the two or more common types of stereo-specific catalysts. The less widely used of these two types is the metal-oxide type of catalyst, such as oxides of molybdenum, vanadium, chromium, tungsten, etc. In polymerizations of this type, solution polymerization is generally effective since the polymer does not separate as a distinct phase prior to separation of the catalyst.

With catalyst systems of the Ziegler-Natta type, solution polymerization is generally not used since the low temperatures and the solvent ratios used favor precipitation of the polymer product. Therefore, processes using catalyst systems of the Ziegler-Natta type are generally "slurry" processes. These process distinctions are independent of the solubility of the catalyst used.

While the handling of slurries present processing problems, apparently the advantages of the Zeigler-Natta type of catalyst overweigh these difficulties. It is also generally regarded that solution processes give inferior polymer products.

Olefinic compounds which are capable of being polymerized to stereoregular polymers are represented by the formula $CH_2=CHR$ wherein R is hydrogen or a radical having 1–12 carbon atoms therein and is of the class of alkyl, cycloalkyl, aryl and halo-aryl radicals, in which halo-aryl radicals the halogen atom is attached directly to the aromatic nucleus, Typical examples of such radicals are methyl, ethyl, propyl, butyl, amyl, hexyl, heptyl, octyl, phenyl tolyl, xylyl, ethylphenyl, chlorophenyl, bromophenyl, fluorophenyl, trichlorophenyl, difluorophenyl, cyclohexyl, cyclopentyl, methylcyclopentyl, ethylcyclohexyl, etc.

In the solution polymerization of propylene and higher olefinic compounds of the formula given above it has been found that there is a substantial portion of undesired amorphous or atactic polymer formed. These atactic polymers have a random polymer structure whereas the desired isotactic type of polymer has a stereoregular structure in which the side branches from the linear chains are arranged in a regular repeating arrangement which permits a desirable crystalline structure with resultant good properties in the polymer.

For example, the isotactic polymer of propylene is a hard, tough material which melts at 165–175° C. and is 65–75% crystalline, as determined by X-ray. As the proportion of atactic polymer is increased in such a polymer product, the tensile yield and tensile modulus properties are adversely affected.

Regardless of the molecular weight of the atactic type of polymer, this amorphous polymer is soluble in cold xylene. In contrast, the isotactic polymer, e.g. isotactic polypropylene, is insoluble in cold xylene. In a solution polymerization process, the most economical method of recovering the polymer is to vaporize the solvent from the product solution. However, this method of recovery results in the simultaneous deposition of the atactic byproduct with the result that the properties of the desired isotactic polymer product are disadvantageously affected. Removal of such atactic byproduct by extraction, by precipitation of the isotactic polymer, etc., entail additional processing steps and expense. Therefore, it is desirable to avoid the necessity to remove substantial amounts of atactic polymer by reducing or avoiding the formation of substantial amounts of such atactic material in the polymerization process.

It should also be noted that, in view of the lower solubility of the isotactic polypropylene, etc., higher temperatures are required to maintain such polymers in solution in economical concentrations during polymerization. Since higher temperatures favor lower molecular weights and increased amorphous polymer, it is difficult to compromise these factors and still carefully control each to contribute to the results to be attained.

Therefore, in summary, it is necessary to minimize the proportion of amorphous polymer byproduct, to control the average molecular weight of the polymer and to obtain a high yield of polymer. If various conditions are varied in order to favorably affect one of these results this can easily adversely affect the other desired results.

It has now been found that these difficulties can be overcome by the process of this invention which involves a continuous, isothermal, adiabatic system for polymerization of propylene and other olefins of the formula $CH_2=CHR$ in which the polymer product is kept in solution throughout and the various process variables are manipulated and controlled to:

(a) avoid precipitation of the polymer product;
(b) keep the production of amorphous byproduct polymer to a tolerable amount;
(c) control the average molecular weight of the polymer product;
(d) control the weight percent of polymer in the reactor effluent to give a viscosity of effluent suitable to subsequent processing steps;
(e) give a high yield of polymer per pound of catalyst consumed.

These desirable results are respectively achieved as follows: (1) polymer precipitation is avoided; and (2) amorphous polymer formation minimized by operating at a reactor temperature just above the precipitation point; (3) the average molecular weight is controlled by regulating the monomer concentration in the reaction mixture by means of regulating the monomer-to-solvent ratio in the feed stream; (4) the polymer content of the effluent is controlled by selecting and adjusting the temperature of the monomer-solvent feed stream up or down so that the reactor temperature control system accordingly increases or decreases the throughput rate and alters the period of monomer-catalyst contact, e.g. by the $\Delta T$, or the difference between effluent and feed temperatures; (5) a high yield of polymer per pound of catalyst is maintained by the intense stirring, by operating at the lowest feasible reactor temperature, by selection of an efficient catalyst, and by control of residence time in the reactor; and (6) the throughput is increased by increasing the catalyst flow rate.

It has been known to make some of these individual adjustments to correct deviations from the desired status of the process. On a commercial scale such individual adjustments are troublesome because a change in one condition to correct one kind of deviation usually causes alteration in other conditions and thereby causes other kinds of deviation from the desired status.

For example, the Morgan Patent 3,108,094 is a prime illustration of the complex instrumentation and control procedures which are required in such polymerization systems. With this complex instrumentation and control procedures, every change made in a process variable requires a compensating change of at least one other variable, the magnitude and direction of which is calculated from several different measurements. To operate such a system without surging and response lags, patentee resorts to two computers and an array of controllers. By contrast, the polymerization system of the present invention is largely capable of making adjustments to hold other process parameters constant when a change is made in a given process parameter.

Various adjustments made to correct for variations in percent polymer in the effluent, in molecular weight of polymer, and in polymer production rate cause changes in the exothermic reaction rate and thereby raise or lower the temperature of the reaction mixture.

In accordance with the practice of this invention, it has now been found that the net undesirable side effects of these various adjustments can be corrected by compensating for these variations in the temperature of the polymerization mixture from the preselected temperature by increasing or decreasing the rate of flow of monomer feed in order to bring the polymerization temperature back to the preselected value.

The process of this invention involves an improvement in a continuous isothermal adiabatic process for the polymerization of olefinic monomers as defined herein involving continuously introducing to a reactor vessel a liquid monomer feed stream comprising the olefinic monomer and an inert solvent for the product polymer; also continuously introducing to this reactor vessel a catalyst feed stream; continuously withdrawing an effluent stream from the reactor vessel; maintaining the reactor vessel essentially full of polymerization mixture and maintaining the pressure on the polymerization mixture in excess of the bubble point thereof; agitating the polymerization mixture to such an extent that its composition is essentially uniform throughout; maintaining isothermal and adiabatic conditions in this mixture such that the rate of heat transfer from the polymerization mixture to the surfaces of the reactor vessel with which the mixture is in contact is essentially zero by virtue of the fact that the exothermic heat evolved in the polymerization process is essentially completely absorbed by the feed streams introduced into the polymerization reactor; this improvement, which affords simple automatic control of the average molecular weight and amorphous content of the product polymer, polymer production rate, and the percent of polymer in the effluent from this polymerization, comprising the steps of periodically (1) Making at least one determination and corresponding adjustment selected from the class consisting of:
(a) determining the molecular weight of polymer in the effluent stream, and when the determined molecular weight is greater than the desired molecular weight, decreasing the ratio of monomer to solvent in the monomer feed stream, and when the determined molecular weight is less than the desired molecular weight, increasing the ratio of monomer to solvent in the monomer feed stream;
(b) determining the percent of polymer in said effluent stream, and when said polymer percent in said effluent stream is less than the desired percentage lowering the temperature of said monomer feed stream, and when said determined polymer percentage is more than said desired percentage raising the temperature of said monomer feed stream;
(c) determining the production rate of the polymer, and when the production rate is below the desired production rate, increasing the rate of introduction of the catalyst feed stream, and when the determined polymer production rate is greater than the desired production rate, decreasing the rate of introduction of catalyst feed stream;

(2) Compensating for the disturbance caused in the rate of heat evolution in the polymerization as the result of the above adjustments by determining the variance of the temperature of the polymerization mixture from a preselected value in the range of 115–250° C. and increasing the rate of introduction of the monomer feed stream when said polymerization mixture is above the preselected value, and decreasing the rate of introduction of the monomer feed stream when the polymerization mixture temperature is below the preselected temperature.

In the above-described process, the preferred modification is that in which all three determinations (a), (b) and (c) are conducted.

As used herein, the term "adiabatic" has the meaning commonly understood in the industry and as discussed in various chemical engineering textbooks, such as:

Hougen and Watson, "Chemical Process Principles—Part One," Wiley, New York (1943), pp. 308–314;

Perry, "Perry's Chemical Engineers' Handbook," 4th edition, McGraw-Hill (1963); Section 5, pp. 24–25; Section 9, pp. 41–42; and Dodge, "Chemical Engineering Thermodynamics," McGraw-Hill (1944), pp. 23–24; pp. 351–353.

In this sense, the description of a continuous flow process as being adiabatic simply means that there is no transfer of heat across the envelope enclosing the system. This envelope can be regarded as the walls of the confining vessel in which the polymerization is effected. In other words the transfer of heat through the walls of the polymerization reactor is substantially zero. In the continuous polymerization systems described therein, the polymerization mixture temperature is maintained at a preselected temperature to give the desired molecular weight, solubility of polymer product, etc. The effluent from this system also has approximately this same temperature. The polymerization is an exothermic reaction and in order for the reaction temperature to be maintained at a constant value in an adiabatic system, the heat given up by the exothermic reaction must be absorbed by the feed streams being introduced to the reactor. These feed streams, particularly the monomer-solvent feed stream, come in at a lower temperature than the reaction temperature, and the $\Delta T$, or the difference between the effluent and feed temperatures, is selected, as indicated above to give the desired polymer content in the effluent. Consequently in order to avoid producing an undesired change in the polymer content of the effluent which would result from altering the feed temperature, the raising or lowering of the temperature in the reactor is effected by adjusting the rate of feeding the monomer-solvent solution in order to maintain the desired reaction temperature.

Solution polymerization requires a choice of an appropriate solvent and operation at a temperature high enough to keep the polymer in solution. In the process of this invention, the solvent can be any non-polymerizable hydrocarbon or mixture of such hydrocarbons of suitable boiling range, preferably a highly purified non-olefinic and non-acetylenic hydrocarbon. For example, preferred materials for propylene polymerization are close boiling mixtures of xylenes, and close boiling mixtures of paraffinic saturated hydrocarbons predominately in the $C_8$ range boiling about 126° C. The reaction temperature must be at least a few degrees above the temperature at which the polymer product will precipitate from the solvent.

In general, the precipitation temperature for aromatic hydrocarbons is a little lower than for paraffinic saturated hydrocarbons. However generally satisfactory results are obtained by using a reactor temperature in the range of 127–135° C. and with an effluent polymer solution of 8–16 percent by weight of polymer therein.

In solution polymerization, it has been found that the main factors which affect the molecular weight are: monomer concentration, temperature and type of catalyst system. The present invention can be used with any catalyst system suitable for solution polymerization of olefins and which gives molecular weights in excess of the range desired for a particular purpose. Such catalysts include those referred to in Patents 3,050,471 and 3,051,690 as well as the various others referred to herein. The latter patent also shows the necessity or desirability of, and another method for, controlling molecular weight of the polymer. Particularly preferred catalyst systems are those disclosed in the co-pending application of Robert O. Lindblom, Ser. No. 242,871, filed on Dec. 3, 1962.

With a particular catalyst system and a particular monomer concentration, the average molecular weight of the polymer product varies inversely according to the temperature. Consequently it is necessary to hold the reactor temperature substantially constant in order to avoid undesirable fluctuations in the average molecular weight. In accordance with the practice of this invention, it has been found that the effects which any changes in the other process variables, either accidental or deliberate, tends to have on the reactor temperature can be counteracted by causing the monomer-solvent feed rate to automatically and directly vary with changes in the reactor effluent temperature.

In the accompanying drawings, FIG. 1 is a curve illustrated by the solubility characteristics of polypropylene in xylene with solubility being plotted against temperature. These particular values are derived from a polypropylene having an average molecular weight of about 300,000.

FIG. 2 has a number of curves showing the effects of temperature and monomer concentration on the molecular weight of the polymer product obtained by using a fixed proportion of a particular catalyst system comprising a reaction product of $TiCl_3$ and $AlEt_3$.

FIG. 3 has a number of curves showing the effects of temperature and monomer concentration for a catalyst comprising the reaction product of $TiCl_3$, $AlEt_3$, lithium triisopropanol amine and thiocresol.

Figure 4:
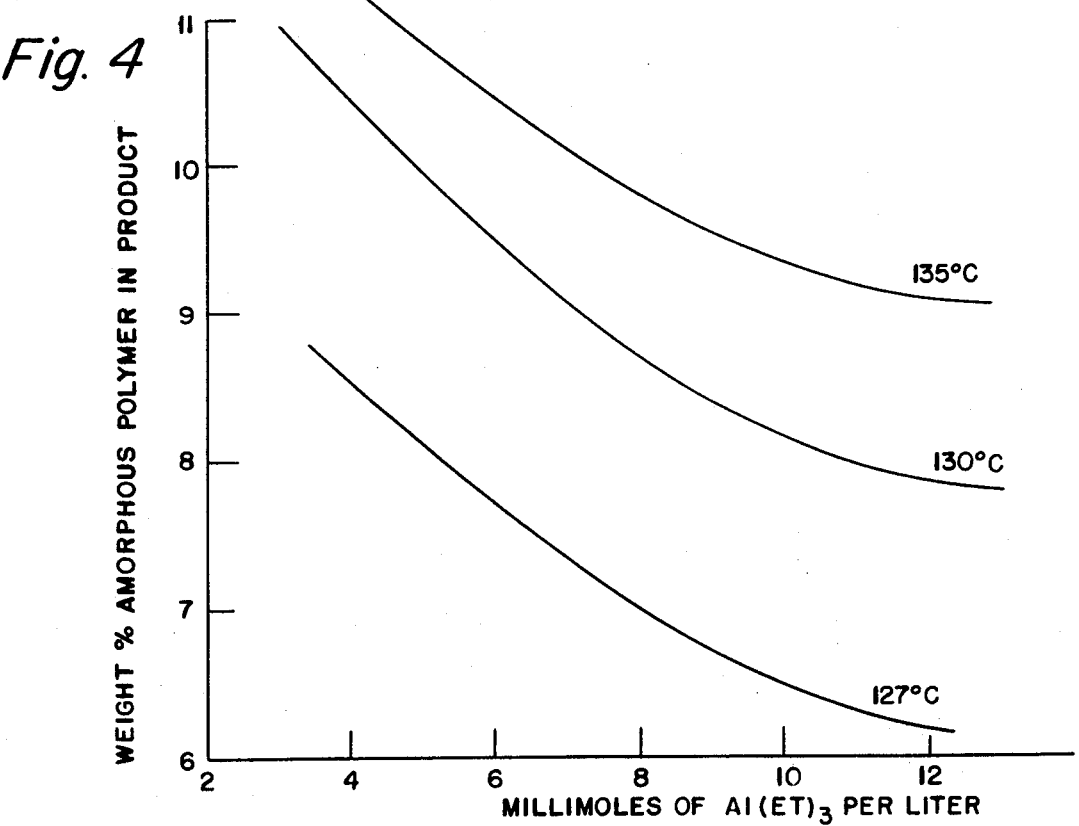
FIG. 4 shows curves for the percent of amorphous polymer produced with a similar catalyst system plotted versus concentration of $AlEt_3$ (other catalyst components held in fixed ratio) with different curves plotted for the various polymerization temperatures.

As shown by FIG. 4, the amorphous byproduct content in a particular catalyst system varies directly with the temperature. Since the objective is to produce a polymer with minimum amorphous content, the temperature is advantageously set at the lowest temperature which will give a practical operation without precipitation difficulties. It is a distinct advantage of the process of this invention that the molecular weight of the polymer can be controlled by selecting an appropriate monomer concentration, without disturbing the temperature.

The following table summarizes the effect of process variables and process operability and product properties.

TABLE I

| With increasing— | Polymer precipitation tendedcy | Average molecular weight | Percent amorphous | Yield per pound of catalyst |
|---|---|---|---|---|
| Temperature | Decreases. | Decreases. | Increases. | Decreases. |
| Monomer mole fraction. | Increases. | Increases. |  | Increases. |
| $Al(C_2H_5)_3$ concentration. |  | (¹) | Decreases. | Decreases. |
| 2-methyl-olefin-1 | Decreases. | Decreases. |  | Decreases slightly. |

¹ Comparable data not available.

The process of this invention is applicable to the polymerization of any olefinic compound of the formula $CH_2=CHR$ in which the polymerization is conducted in solution regardless of the type of catalyst system used for the polymerization. Catalyst systems of the Ziegler-Natta type as well as various other catalysts suitable for solution polymerization can be conveniently used. Particularly preferred are catalyst system using complexes of a transition metal compound advantageously in a reduced valency state. Such catalyst systems are illustrated by the use of $TiCl_3$—$AlR'_3$ wherein $R'$ represents an alkyl group preferably of no more than 8 carbon atoms but can also represent higher alkyl radicals, aryl radicals, and cycloalkyl radicals, advantageously of no more than about 15 atom carbons. While most of the examples and illustrations given herein are directed to the reaction product of $TiCl_3$ with Al triethyl and lithium triethanolamine, sometimes the Al triethyl being referred to herein as ATE or $AlEt_3$, or other catalysts of the transition metal-complex types and various other types can be used in place of this particular catalyst.

Moreover while most of the illustrations and discussion herein are directed to polymers of propylene, the invention can likewise use the other olefinic compounds as defined in place of propylene, with the solubilities, molecular weights, and various other properties being appropriately modified according to such other polymers.

In the process of this invention, the molecular weight and other properties of the polymer product can be simultaneously controlled as desired by manipulation of the process variables. In the practice of this invention polymers of propylene and higher olefins can be produced and controlled in the range of 5,000–1,000,000. For commercial purposes, molecular weights of thse products are desirably in the range of about 100,000 to 650,000 which are easily obtained by the practice of this invention. Polyethylene is preferably produced and controlled in the range of 3,000 to 300,000.

Furthermore the molecular weight distribution is affected by the nature of the catalyst used in the polymerization and in the degree of cracking permitted at the devolatilizing stage. Therefore where molecular weight distribution is to be controlled, this can be further controlled by the selection of the particular catalyst and control of the cracking conditions.

Figure 1:
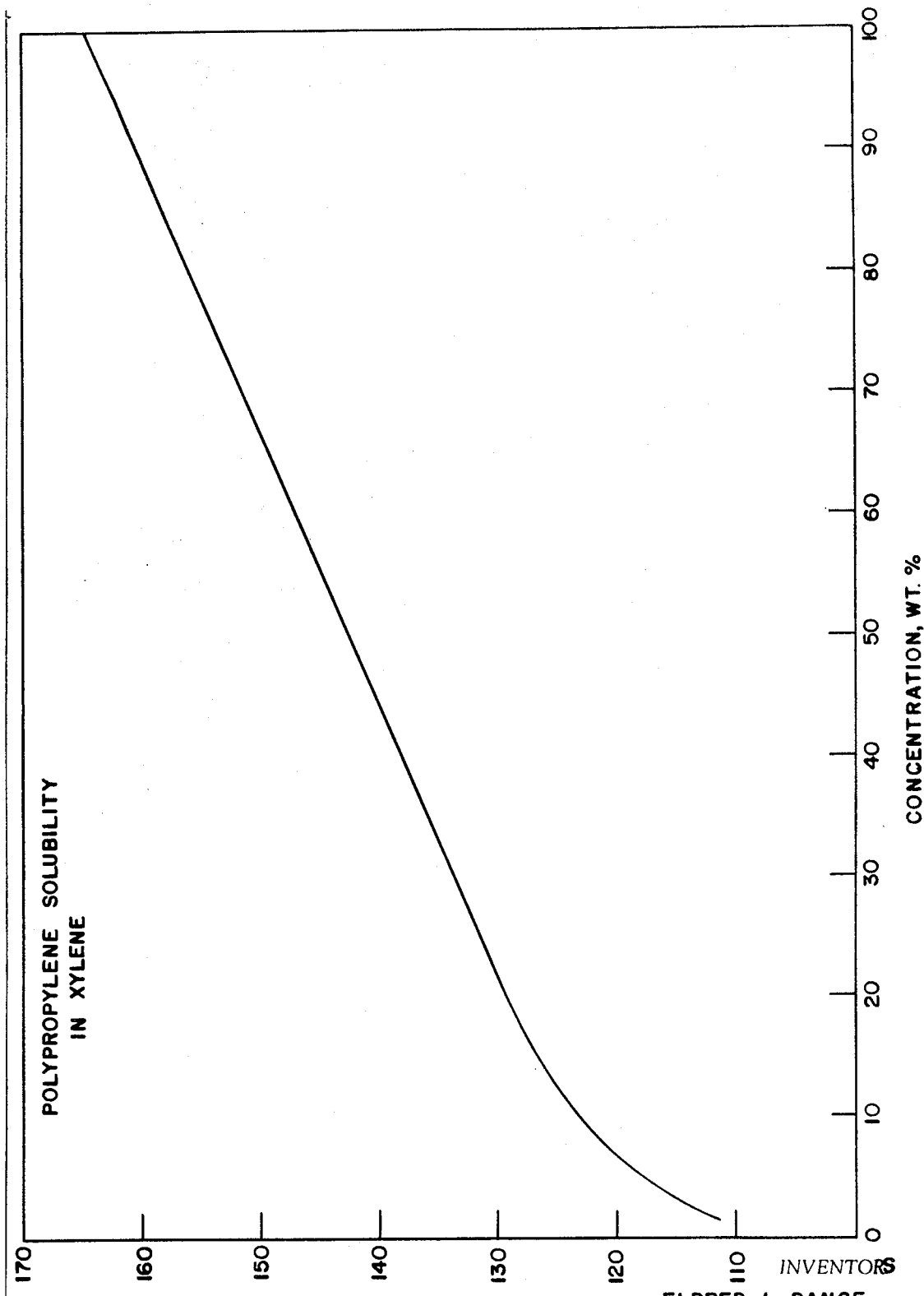

FIG. 1 illustrates the solubility at various temperatures of a polypropylene having a molecular weight of approximately 300,000. From this curve, it is obvious that careful control of the temperature and concentration of polymer must be effected to prevent precipitation.

Figure 2:
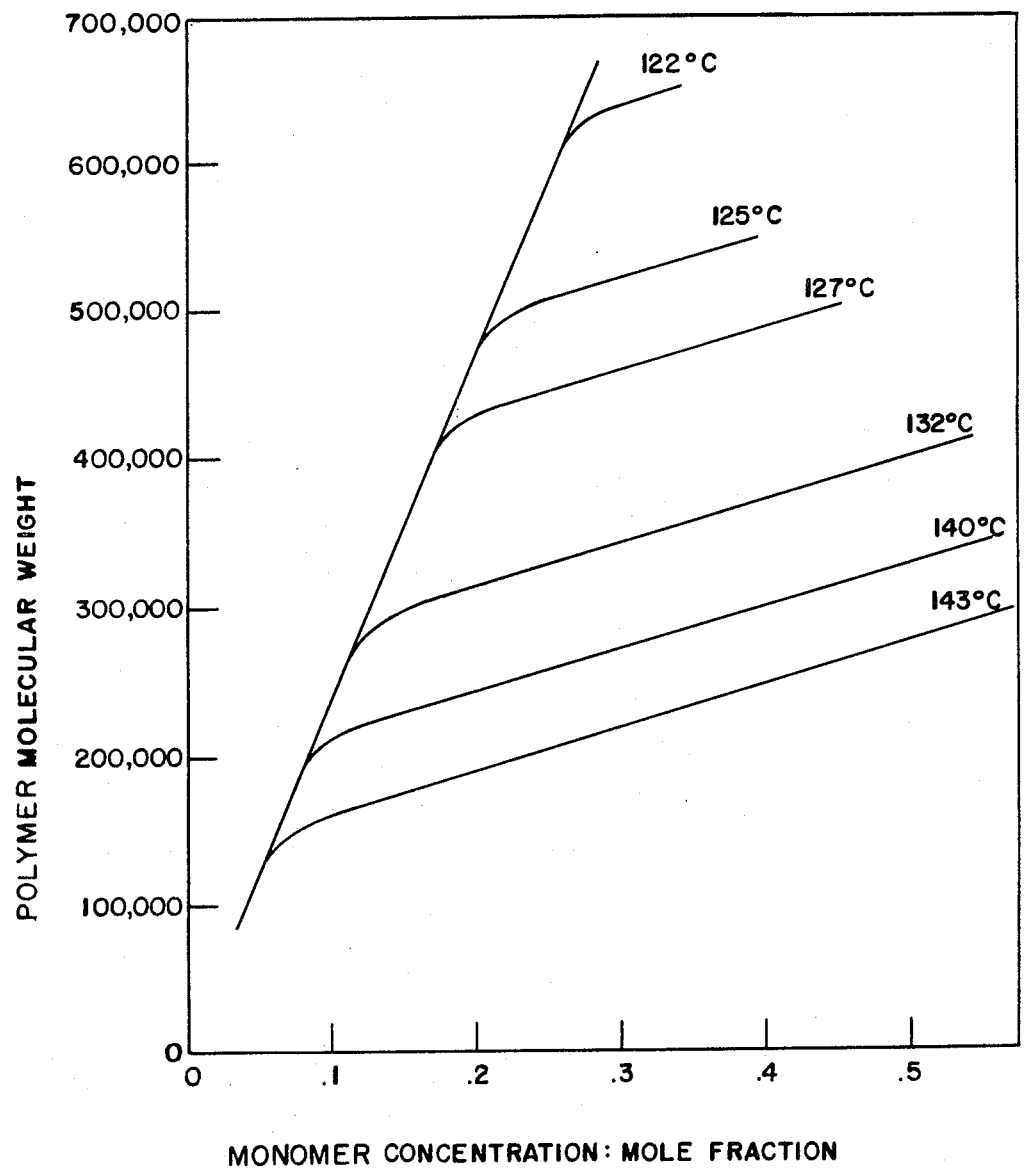

FIG. 2 shows how the molecular weight of the propylene polymerization product varies according to the polymerization temperature. As indicated by the individual curves, the molecular weight of the product decreases as the polymerization temperature is increased. Moreover, these curves show that for any particular temperature, as the monomer concentration is increased, the molecular weight of the product is increased. Even a 5° variation in temperature can have considerable effect on molecular weight. However, it must be kept in mind that as the temperature is lowered and the monomer concentration is increased, the point of incipient precipitation is more easily approached, for the reasons that there is ultimately more polymer formed, less solvent present and the monomer is not as good a solvent for the polymer.

Figure 3:
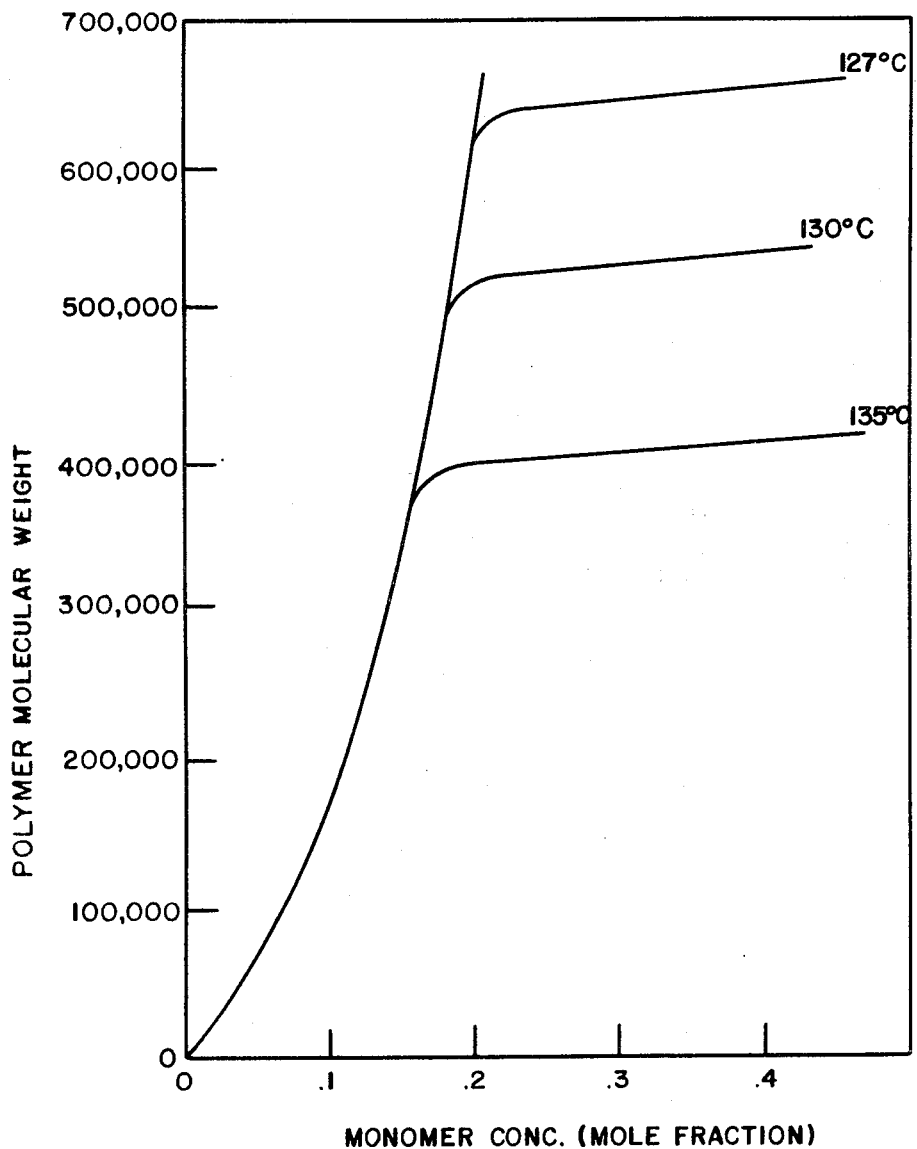

FIG. 3 shows that for a particular temperature and a particular concentration of a different catalyst the molecular weight-monomer concentration relationship is similar but significantly different. These curves show by the initial steep portion that a very slight change in the monomer concentration causes a very pronounced change in resultant molecular weight, for example in the 100,000–400,000 range and even higher as lower temperatures are used.

FIG. 4 shows that for a particular polymerization temperature, the weight percent of amorphous propylene polymer in the product is decreased as the concentration of $AlEt_3$, etc. is increased. These curves also illustrate that the percent of amorphous polymer is also decreased by decreasing the polymerization temperature. For example a 3° change in temperature can increase the amorphous content of the product from 7.2% to 8.8%, which can be the difference in requiring fractional separation of amorphous polymer by solvent extraction or other means.

Figure 5:
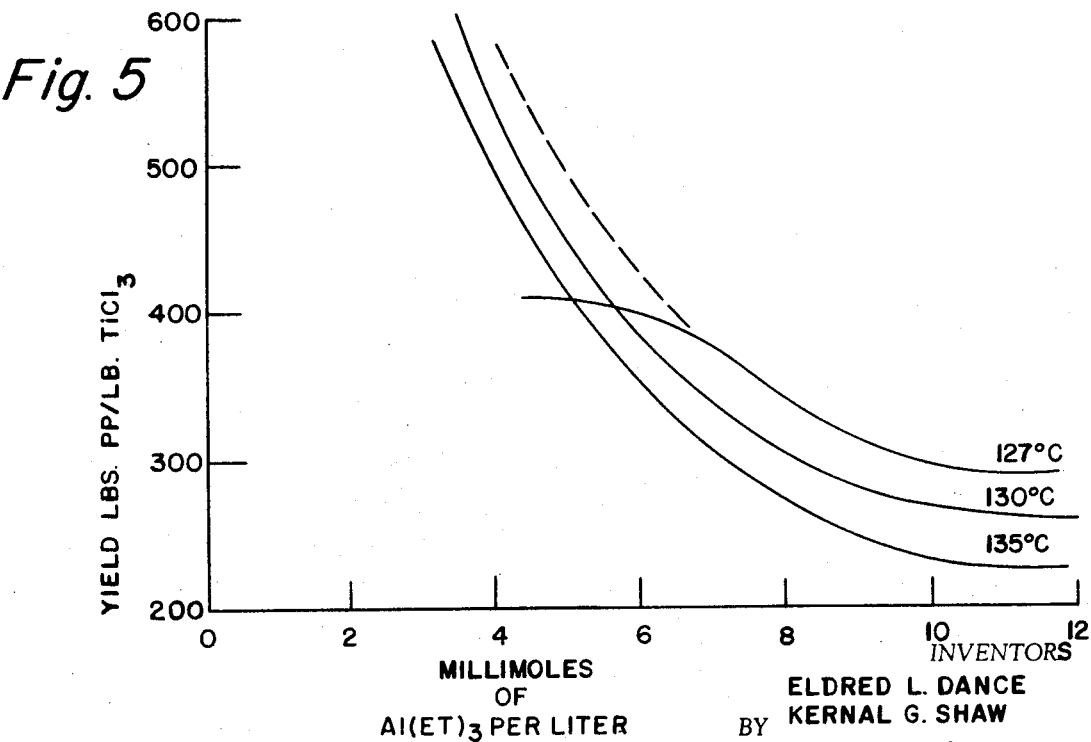
FIG. 5 shows curves at each of three different polymerization temperatures for the yield of polymer obtained per pound of catalyst versus $AlEt_3$ millimoles per liter concentration (with other catalyst components held in fixed ratio).

FIG. 5 shows that for various polymerization temperatures, as the concentration of $AlEt_3$, etc. (millimoles per liter) is increased, the yield of propylene polymer in pounds per pound of $TiCl_3$ is decreased. The curve for the values of the polymerizations run at 127° C. differs in its configuration from the other curves in view of the fact that at this temperature, the lowest concentration of catalyst produced such a proportionately high yield of polymer that the precipitation point was exceeded. The dotted portion indicates the projected configuration of this curve.

It is to be noted also, with respect to FIG. 2 that these polymerizations were conducted with the reaction product of $AlEt_3$ and $TiCl_3$ as catalyst. In FIGS. 3, 4 and 5 the polymerizations were conducted with catalyst having as essential constituents $TiCl_3$, $AlEt_3$, thiocresol and lithium alkanolamine. This latter catalyst, used in the experiments on which FIG. 3 is based, produce a much flatter response with respect to molecular weight increase according to increase in monomer concentration.

Figure 6:
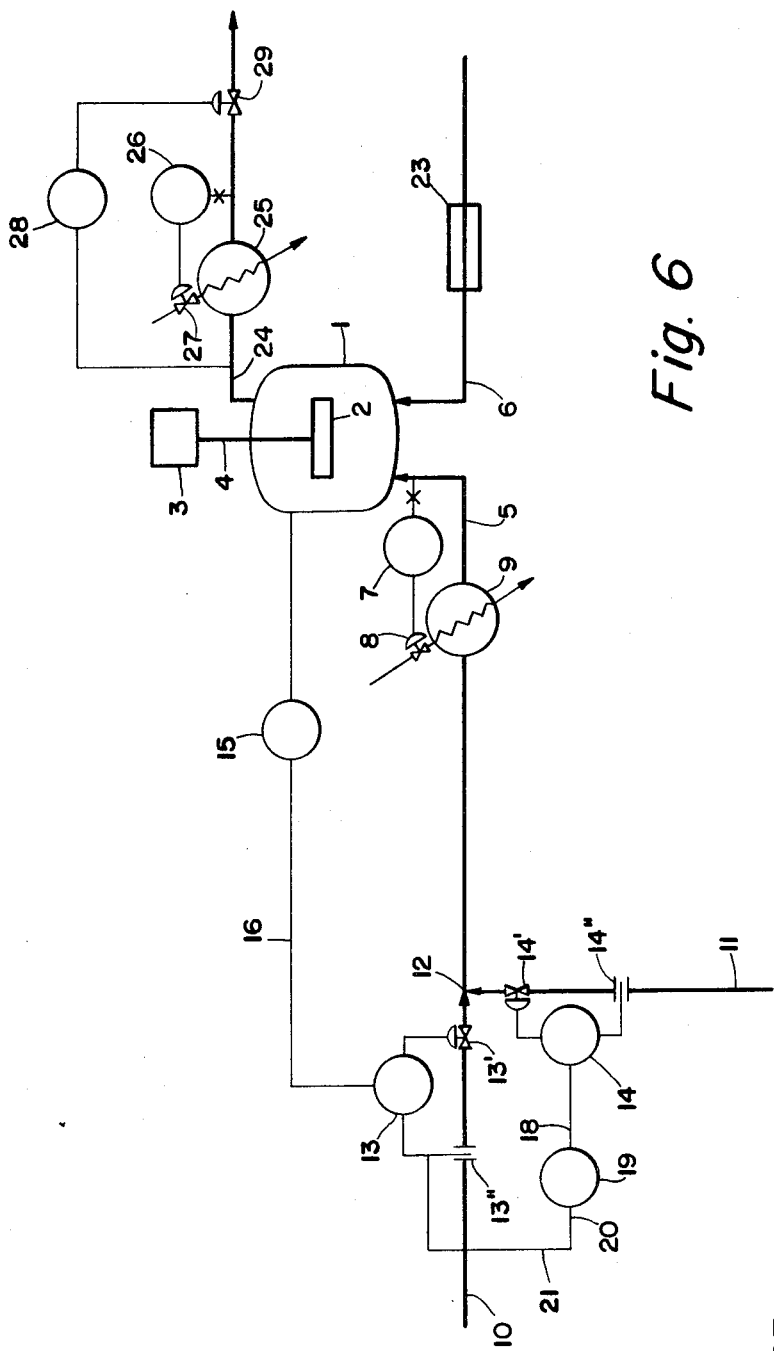
FIG. 6 is a flow sheet of the equipment used in the polymerization process of this invention including the various control systems used for adjusting the monomer feed rate.

In the flowsheet of FIG. 6 which represents a typical arrangement of equipment that can be used in the practice of this invention, polymerization reactor 1 is equipped with heating means for bringing the reactor and contents to temperature. Once the desired temperature is initially reached, the jacket is used merely for the purpose of insulating the reactor while it is operated under isothermal, essentially adiabatic conditions.

The reactor is equipped with an efficient stirrer or agitator 2 driven by motor 3 through shaft 4. Inlet line 5 is the inlet means for the monomer and solvent. Inlet line 6 is the inlet means for the preformed catalyst.

Temperature control device 7 has a temperature taking means attached in line 5 near the inlet to the reactor and is connected to an actuating means 8 which is responsive to variations in temperature of the feed stream passing through line 5. Accordingly the rate of cooling fluid passing through cooling means 9 is adjusted responsive to variations in temperatures of the feed stream in line 5.

Solvent is fed by a centrifugal pump (not shown) through line 10 and monomer is fed by a centrifugal pump (not shown) through line 11 into line 5 at junction 12 where monomer and solvent mix. Feed rate control 13 adjusts the rate of flow of solvent through line 10 and feed rate control 14 adjusts the rate of flow of monomer through line 11. Temperature responsive control 15 is connected to and is actuated by a temperature taking and responsive means (not shown) in reactor 1, and is therefore accordingly responsive to variations in temperature in the reaction mass in the reactor. Responsive to variations in such temperatures, temperature control device 15 actuates adjustments in feed rate control 13 to adjust the rate of flow of solvent and also actuates feed rate control device 14 which adjusts the rate of flow of monomer through line 11. Valve 13' and orifice 13" participate in the operation of controlling solvent feed rate, and valve 14' and orifice 14" participate in the operation of controlling monomer feed rate.

Temperature recording control 15 is connected to feed rate control 13 by line 16. In turns feed rate control 14 is connected by line 18 to ratio control 19 and in turn connected to feed rate control 13 through lines 20 and 21. Adjustments to feed rate control device 13 actuted by temperature recording control 15 simultaneously effects corresponding adjustments in feed rate control 14 through lines 18, 20 and 21.

The catalyst component fed through line 6 is fed at a constant rate by means of reciprocating proportioning or metering pump 23.

The reactor is completely filled with the reaction mass in liquid state and the polymerization product flows out line 24 through heater 25 whose temperature is adjusted according to temperature responsive control means 26 which actuates valve 27 to increase or decrease the flow of heating medium through heater 25.

Pressure responsive control means 28 maintains the desired pressure on the reaction system. Control means 28 responds to changes of pressure in outlet line 24 and actuates valve 29 to increase or decrease the rate of flow through line 24. The pressure in reactor 1 is thereby restored by such change in rate of outflow. The temperature and pressure measuring and responsive devices or control actuating means are standard types of equipment for such purposes. Likewise, the controls for regulating temperature and liquid flow rates are also standard devices.

As pointed out above, the polymerization temperature in reactor 1 is desirably controlled at as low a temperature as possible in order to give a low amorphous content in the polymerization product, and also the temperature must be sufficiently high that the system remains above the incipient precipitation temperature of the polymer. For propylene polymerization, this temperature is preferably in the range of 125–145° C.

The monomer-solvent feed solution temperature is desirably maintained constant and in the range of −20° to 40° C., depending on desired polymer concentration in the reactor effluent. Reactor temperature control is achieved by means of varying the feed rate of the solvent and monomer flows, which are held at a set ratio, while maintaining catalyst flow constant. Thus a temperature rise calls for a higher flow rate to give a greater total heat absorbing capability while at the same time reducing the polymer production rate by shortening the catalyst residence time.

The weight percent of polymer in the reactor product is controlled by control of the $\Delta t$ between inlet and exit temperature. In the adiabatic reactor this temperature rise must correspond to a definite unit weight of polymer production per unit weight of feed. Since the feed ratio of monomer to solvent is fixed, the controlled conversion of monomer also results in a controlled residual monomer concentration.

In summary, both temperature and monomer concentration in the fluid in which the catalyst is suspended are thus controlled and these are the important variables affecting the product properties of molecular weight and amorphous content.

While temperature variations could be used to control the molecular weight of the polymer product, increase in temperature has an adverse effect on the amorphous content of the product and on the activity of the catalyst. Therefore it is preferred to control the molecular weight by the concentration of monomer in the reaction solution. Hence, for a given catalyst system, the desired molecular weight range in the product is attained by maintaining the appropriate concentration of monomer in the reactor. This is done by holding the monomer-solvent ratio in the monomer-feed solution at a constant value which will give the desired concentration in the reactor for a given set of values for the other process variables.

Thus by holding the monomer concentration at an appropriate value to give the desired molecular weight range in the product, and by carefully controlling the reactor temperature so as to avoid changes in the molecular weight and to avoid adversely affecting the amorphous content of the product, it is possible by the practice of this invention to operate a continuous polymerization process, and to compensate for fluctuations in the operating conditions, merely by adjusting the rate of flow of monomer feed solution into the reactor in accordance with any variation which may tend to affect the temperature within the reactor.

In preferred practice, the monomer-solvent ratio in the feed stream is held constant and the temperature differential between the feed solution and the reactor is maintained constant. Then as any fluctuations occur in the temperature of the reactor, these are compensated for by automatically increasing or decreasing the flow rate of monomer-solvent feed to compensate for and correct or counteract such changes.

In the event it is desired to modify the operation of the process to produce either a higher or lower molecular weight in the polymer product, this can be effected by changing the monomer-solvent ratio without adjusting the temperature setting to give such molecular weight change.

The reactor of the above system is completely filled with liquid and operated at a pressure above the bubble point pressure of reaction mixture. This is done to avoid any unfavorable effects of having vapour present in the reactor.

In view of the very careful control permitted by this invention, it is possible to operate this polymerization system as a solution polymerization whereas most polymerizations using the Ziegler-Natta catalyst systems are conducted as slurry systems because less efficient control of the system results in the polymer being precipitated during the reaction. In this case, by a careful control of factors which ordinarily produce adverse effects, it is possible to operate at temperatures and pressures which maintain the polymer product in solution throughout the course of the polymerization. Except for the various factors and conditions described herein, the operating conditions and purity of material used are similar to those used in polymerizations of similar types. The catalyst components can be of a purity and type commonly used in the prior art. The conventional methods of feeding catalyst to the polymerization system can be used. The propylene or other olefinic compound is of a high purity and the impurities present are close-boiling hydrocarbons, for example, those associated with propylene are small amounts of propane and ethane.

The process of this invention is best described by the following examples. These examples are given for the purpose of illustration and it is not intended that the scope of the invention nor the manner in which it can be practiced are to be limited by these specific descriptions. Unless specifically indicated otherwise, reference in these examples and throughout the specification to parts and percentages are to parts and percentages by weight.

EXAMPLE I

A continuous polymerization system is operated for a number of runs in equipment arranged according to the flowsheet of FIG. 6 using a completely liquid filled reactor with a capacity of 72 gallons and a preformed catalyst comprising the reaction product of $TiCl_3$, $AlEt_3$, thiocresol and lithium triethanolamine. The conditions of the runs and the results obtained are given in Table I.

This system has the advantage of reduced hazard in starting the polymerization in that an excessive exotherm is avoided by gradually increasing the catalyst flow until the desired control is reached. Moreover, in shutting down the operation, as the catalyst feed is reduced or cut-off the temperature control automatically shuts down the monomer feed so that the effluent has the correct solids contents and thereby avoids a slug of inferior product.

TABLE II

| Experiment number | 1 | 2 | 3 | 4 | 5 |
|---|---|---|---|---|---|
| Propylene (parts) | 21.5 | 16.5 | 15.0 | 20.0 | [1] 24.0 |
| Xylene (parts) | | 115 | 128 | | |
| Octanes (parts) [2] | 88.6 | | | 96.6 | 107 |
| Feed temperature, °C | 40 | | 45 | 46 | |
| Reactor temperature, °C | 127 | 130 | 132 | 135 | 130 |
| Reactor pressure, p.s.i.g | 350 | 300 | 355 | 350 | 350 |
| Residence time (hours) | 3.1 | 3.4 | 3.2 | 3.1 | 2.7 |
| Reactor effluent: | | | | | |
| Weight percent polymer (monomer-free) | 11.0 | 8.6 | 7.9 | 12.1 | [3] 11.9 |
| Molecular fraction monomer (polymer-free) | 0.244 | 0.11 | 0.074 | 0.159 | 0.160 |
| Molecular weight of polymer | 550,000 | 340,000 | 480,000 | 600,000 | 470,000 |
| Weight percent amorphous in polymer | 6.6 | 8.2 | 4.8 | 7.7 | 9.7 |

[1] Also contains 0.26 part ethylene.
[2] Boiling about 126° C.
[3] Contains 3.4% ethylene in polymer.

In a typical operation of this process, the feed to the reactor is at about 20° C. and comprises about 20 parts per hour of propylene per 100 parts per hour of solvent with the effluent at about 130° C. containing about 10 parts polymer and 10 parts monomer per hour.

EXAMPLE II

The above process is repeated a number of times using individually a number of other olefinic compounds as listed below making appropriate modifications in the operating and feed temperatures, the monomer-feed solvent ratio and other factors appropriate to each monomer, using the same catalyst system as used in Example I. In each case continuous operation of the polymerizer is successfully effected with uniform molecular weight being produced in the polymer product.

(a) Butene-1;
(b) n-Pentene-1;
(c) 3-Me-butene-1;
(d) n-Octene-1;
(e) 50–50 mole mixture of propylene and styrene;
(f) 70–30 mole mixture of butene-1 and p-Me-styrene;
(g) 75–25 mole mixture of n-pentene-1 and p-Cl-styrene;
(h) 50–50 mole mixture of butadiene and propylene;
(i) 75–25 mole mixture of propylene and vinyl cyclohexane.

EXAMPLE III

The procedure of Example I is repeated successfully a number of times using the following individual catalyst systems in place of the catalyst used in Example I and using equivalent amounts and similar mole ratios as used in Example I:

(a) $TiCl_4$ plus $AlEt_3$;
(b) $TiCl_3$ plus Al tri-isobutyl;
(c) $ZrCl_4$ plus $AlEt_3$;
(d) $ZrCt_3$ plus $AlBu_3$;
(e) n-BuLi;
(f) $LiAlEt_4$;
(g) $TiCl_4+Ti$ (mixture previously ballmilled in inert atmosphere).

The percent amorphous polymer is determined as the amount of polymer product soluble in xylene at room temperature. In determining the amount of amorphous polymer present in a particular polymerization product, it has been found that the determination is more accurate when the polymerization reaction mass is allowed to cool slowly so as to precipitate the polymer in very fine particles. The following procedure is found to be most suitable. A substantial volume of polymerization product is withdrawn under an inert atmosphere into an insulated container. Then a small amount of water is added to inactivate the catalyst. This product is allowed to cool as slowly as possible overnight. As a result, the polymer is precipitated in a fine, granular form. To this is added 200 ml. of additional xylene. The resulting mass is thoroughly slurried, and the xylene decanted or separated by filtration from the precipitate. The polymer precipitate is dried and weighed and the volume of the xylene solution is measured. About 25 ml. of the xylene solution is evaporated and the residue weighed. The weight of the dissolved polymer in the entire solution is calculated and the percent of soluble polymer on the basis of total polymer is calculated.

Generally, the polymerizations can be conducted in accordance with this invention in a rather broad temperature range, namely from about room temperature, preferably at least about 50° C., to about 250° C. depending on the solubility of the particular polymer being formed. From about 115° C. to about 250° C., preferably 125–145° C. is suitable for propylene, as well as for butene-1 and n-pentene-1.

Pressures ranging from atmospheric up to 20,000 lbs. per square inch can be used, although it is generally more convenient to operate in the range of atmospheric pressure up to 500 p.s.i. depending upon the particular olefinic material used and whatever other conditions are suitable for the reaction.

Efficient stirring is important and should be of such a character that the effluent from the reactor and the reactor contents near the feed inlet are at substantially the same temperature and monomer content.

Since catalysts vary in sensitivity and efficiency according to their history and various factors, this makes it more difficult to govern and control polymerizations by such catalysts. This makes especially useful and practical the present method of controlling the polymerization by varying the temperature and monomer concentrations as described herein.

Typical olefinic compounds that can be used in the practice of this invention include but are not restricted to the following: ethylene, propylene, butene-1, n-pentene-1, 3-ethyl-butene-1, 3-methylbutene-1, hexene-1, octene-1, butadiene-1,3, isoprene, hexadiene-1,5, vinylcyclohexane, vinylcyclohexene, vinylcyclopentane, vinylmethylcyclohexane, styrene, vinyl toluene, ethyl styrene, isopropyl styrene, butyl styrene, hexyl styrene, dimethyl styrene, diethyl styrene, vinyl diphenyl, vinyl naphthalene, vinyl methylnaphthalene, ar-chloro styrene, ar-dichloro styrene, ar-bromo styrene, ar-iodo styrene, ar-fluoro styrene, vinyl ar-chloro-naphthalene, vinyl methyl diphenyl, vinyl ar-chlorodiphenyl, etc.

Various catalyst systems for polymerizing olefinic compounds to solid products, including those of the Ziegler-Natta type are known in the art. Such systems are suitable for use in the process of this invention.

In the polymerization of propylene and higher olefins in accordance with this invention, the temperature is advantageously in the range of 115–250° C., preferably 125–145° C., with monomer concentration in the range of 0.001–0.9 mole fraction, preferably 0.001–0.5, on a polymer-free basis. With ethylene, the polymerization temperature is advantageously 115–250° C., preferably 120–200° C., and the monomer concentration is advantageously 0.001–0.4 mole fraction, preferably 0.001–0.25 mole fraction on a polymer-free basis.

The catalyst concentration is not critical, but a preferred range is 0.1–100 millimoles of the transition metal component, or equivalent component, per liter of solvent.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. In a continuous process for the solution polymerization of an olefinic monomer of the formula $CH_2=CHR$ in which R is a radical having no more than 12 carbon atoms selected from the class consisting of hydrogen, alkyl, aryl, cycloalkyl and haloaryl radicals, in which haloaryl radical each halogen atom is attached directly to an aromatic nucleus, comprising the process steps of continuously introducing to a reactor vessel a liquid monomer feed stream comprising said olefinic monomer and an inert solvent for the product polymer, also continuously introducing to said reactor vessel a catalyst feed stream containing a catalyst suitable for solution polymerization of olefins; continuously withdrawing an effluent stream from said reactor vessel; the improvement wherein desired values of polymer average molecular weight, effluent polymer content, polymer production rate and polymer amorphous content can be readily established and simply and automatically maintained, comprising the steps of (1) maintaining said vessel essentially full of polymerization mixture and maintaining a pressure on said polymerization mixture in excess of the bubble point thereof;

(2) maintaining adiabatic conditions in said mixture such that the rate of heat transfer from the polymerization mixture to the surfaces of said reactor vessel with which said mixture is in contact is essentially zero;

(3) continually determining the molecular weight of the polymer in the effluent and actuating, in accordance with molecular weight variations, an adjustment of the monomer content in said monomer feed stream so as to decrease the ratio of monomer to solvent in said monomer feed stream when the molecular weight of the polymer in said effluent is greater than desired and to increase said ratio when the molecular weight of the polymer in said effluent is less than desired;

(4) continually determining the percent of polymer in the effluent and actuating, in accordance with variations in said percent polymer in the effluent, an adjustment of the temperature of the monomer feed stream so as to lower the temperature of said monomer feed stream when the percent of polymer in the effluent stream is less than the desired value and to raise said temperature when the said percent of polymer in said effluent stream is greater than desired;

(5) continually determining the rate of polymer production and actuating, in accordance with variations in the polymer production rate, an adjustment of the rate of catalyst introduction so as to increase the rate of catalyst introduction when the polymer production rate is less than desired, and to decrease said rate when the polymer production rate is greater than desired;

(6) continually determining the temperature of the effluent and actuating, in accordance with variations in said temperature, an adjustment of the monomer feed rate so as to increase the rate of introduction of said monomer feed stream when the temperature of the effluent as it exits from said vessel is greater than desired and to decrease the rate of introduction of said monomer feed stream when said temperature is less than desired, the desired temperature being between about 115° and about 250° C.

2. The process of claim 1 in which said olefinic compound is propylene.

3. The process of claim 1 in which said olefinic compound is butene-1.

4. The process of claim 1 in which said olefinic compound is n-octene-1.

5. The process of claim 1 in which said olefinic compound is n-pentene-1.

6. The process of claim 1 in which said olefinic compound is vinylcyclohexane.

7. The process of claim 2 in which said solvent is xylene.

8. The process of claim 2 in which said solvent is a mixture of paraffins boiling in the octane range.

9. The process of claim 8 in which the temperature of said polymerization mixture is maintained in the range of 125° C. to 145° C.

10. The process of claim 9 in which said monomer feed stream is maintained at a temperature in the range of −20° C. to 40° C.

References Cited

FOREIGN PATENTS 637,766   4/1962   Italy _____ 260—94.3

JAMES A. SEIDLECK, Primary Examiner

A. HOLLER, Assistant Examiner

U.S. Cl. X.R.

260—91.5, 93.5 S, 93.7, 94.9 B, 94.9 D, 94.9 P